(12) United States Patent
Kylström

(10) Patent No.: US 9,145,859 B2
(45) Date of Patent: Sep. 29, 2015

(54) FUEL SYSTEM FOR INJECTION OF A FUEL MIXTURE IN A COMBUSTION ENGINE

(75) Inventor: Kim Kylström, Tullinge (SE)

(73) Assignee: SCANIA CV AB (SE)

( * ) Notice: Subject to any disclaimer, the term of this patent is extended or adjusted under 35 U.S.C. 154(b) by 395 days.

(21) Appl. No.: 13/703,415

(22) PCT Filed: Jun. 17, 2011

(86) PCT No.: PCT/SE2011/050765
§ 371 (c)(1),
(2), (4) Date: Dec. 11, 2012

(87) PCT Pub. No.: WO2011/162682
PCT Pub. Date: Dec. 29, 2011

(65) Prior Publication Data
US 2013/0087124 A1    Apr. 11, 2013

(30) Foreign Application Priority Data
Jun. 22, 2010   (SE) .................... 1050663-2

(51) Int. Cl.
*F02M 37/00*   (2006.01)
*F02M 25/00*   (2006.01)
(Continued)

(52) U.S. Cl.
CPC ........... *F02M 43/00* (2013.01); *F02D 19/0655* (2013.01); *F02D 19/0665* (2013.01);
(Continued)

(58) Field of Classification Search
CPC .............. F02M 43/00; F02M 37/0088; F02M 63/0225; F02M 37/0052; F02D 19/081; F02D 19/0655; F02D 19/0665

USPC ............. 123/447, 456, 457, 510, 511, 27 GE, 123/525, 431, 575, 514
See application file for complete search history.

(56) References Cited

U.S. PATENT DOCUMENTS 4,388,893 A   6/1983   Apfel ............................ 123/25 J
5,097,803 A   3/1992   Galvin ............................ 123/3
(Continued)

FOREIGN PATENT DOCUMENTS

DE   10 2004 011 414   4/2005
GB   1 377 754   12/1974
(Continued)

OTHER PUBLICATIONS

International Search Report mailed Sep. 12, 2011 in corresponding PCT International Application No. PCT/SE2011/050765.
(Continued)

*Primary Examiner* — Hai Huynh
(74) *Attorney, Agent, or Firm* — Ostrolenk Faber LLP

(57) ABSTRACT

A fuel system for injection of a fuel mixture in a combustion engine includes an inlet circuit (13, 17) leading fuel to the engine (1). The inlet circuit (13) includes a feed pump (7), a high-pressure pump (15), an accumulator tank (16), and at least one injection unit (18) injecting fuel in a combustion space of the engine (1). The inlet circuit (13, 17) includes a space (7a) for receiving a first fuel (3) from a first fuel source (2, 6) and a second fuel (5) from a second fuel source (4, 10). A mixing device (7) mixes to the first fuel (3) and the second fuel (5) resulting in a substantially uniform fuel mixture which the injection unit (18) injects into the engine's combustion space.

13 Claims, 1 Drawing Sheet

(51) Int. Cl.
 *F02B 7/00* (2006.01)
 *F02M 43/00* (2006.01)
 *F02D 19/06* (2006.01)
 *F02M 63/02* (2006.01)
 *F02D 19/08* (2006.01)

(52) U.S. Cl.
 CPC .......... *F02D19/0684* (2013.01); *F02D 19/081*
 (2013.01); *F02M 37/0088* (2013.01); *F02M*
 *63/0225* (2013.01); *Y02T 10/36* (2013.01)

(56) References Cited

U.S. PATENT DOCUMENTS

| | | | | |
|---|---|---|---|---|
| 5,336,396 | A * | 8/1994 | Shetley | 210/90 |
| 5,904,121 | A * | 5/1999 | Mezheritsky et al. | 123/25 C |
| 7,802,562 | B2 * | 9/2010 | Lippa et al. | 123/577 |
| 8,393,312 | B2 * | 3/2013 | Lewis et al. | 123/305 |
| 2002/0069856 | A1 | 6/2002 | Mayer et al. | 123/510 |
| 2002/0070295 | A1 | 6/2002 | Baker et al. | 239/533.3 |
| 2002/0102177 | A1 | 8/2002 | Bodzak | 418/206.1 |
| 2008/0262701 | A1 | 10/2008 | Williams et al. | 701/103 |

FOREIGN PATENT DOCUMENTS

| | | |
|---|---|---|
| JP | S61-155652 | 9/1986 |
| JP | 2002-155824 | 5/2002 |
| JP | 2002-202017 | 7/2002 |
| JP | 2002-357139 | 12/2002 |
| JP | 2003-056410 | 2/2003 |
| JP | 2010-071219 | 4/2010 |

OTHER PUBLICATIONS

English translation of Office Action dated Jan. 28, 2014 issued in corresponding Japanese Patent Application No. 2013-516528.

* cited by examiner

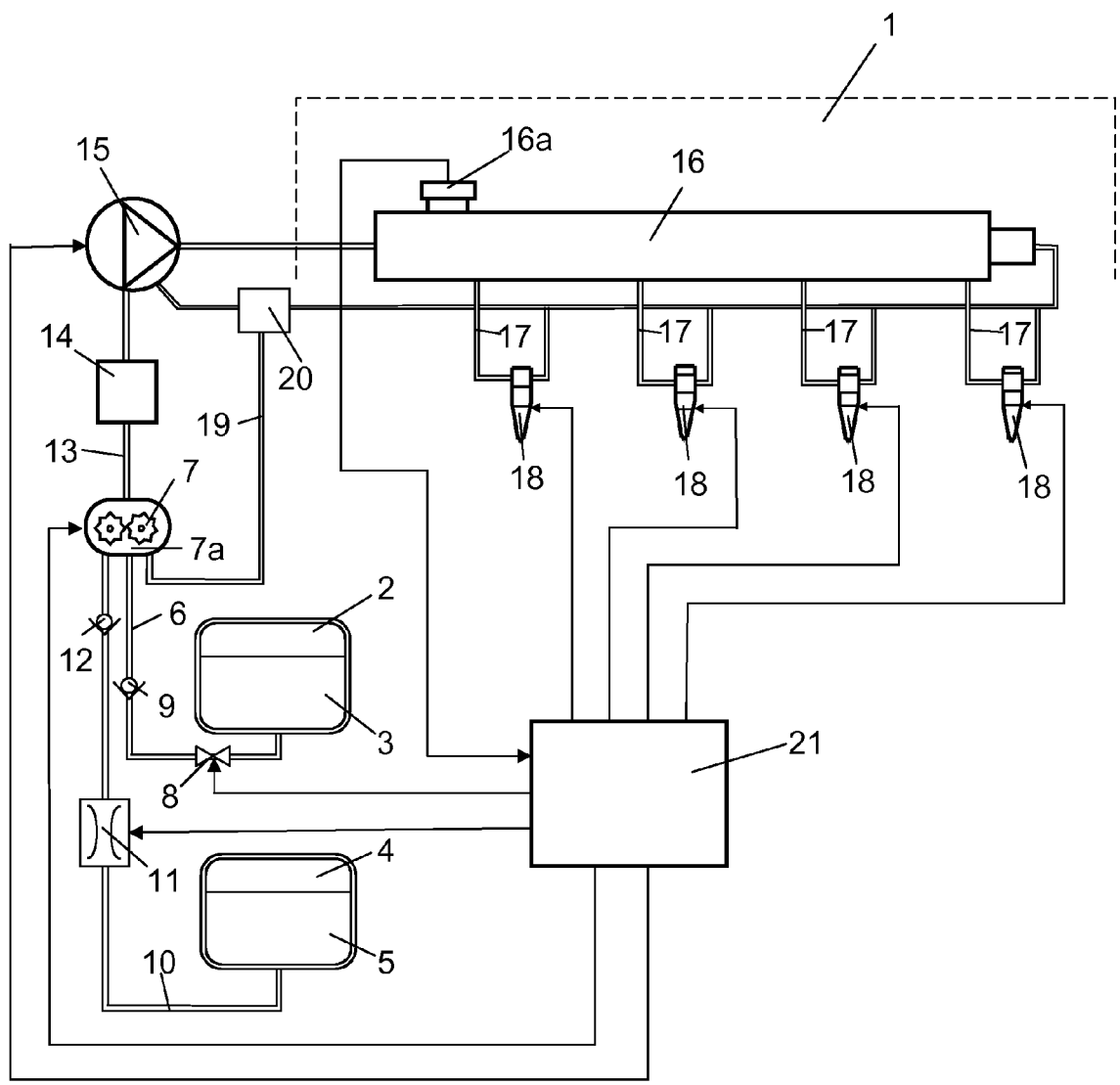

FUEL SYSTEM FOR INJECTION OF A FUEL MIXTURE IN A COMBUSTION ENGINE

CROSS-REFERENCE TO RELATED APPLICATIONS

The present application is a 35 U.S.C. §§371 national phase conversion of PCT/SE2011/050765, filed Jun. 17, 2011, which claims priority of Swedish Application No. 1050663-2, filed Jun. 22, 2010, the contents of which are incorporated by reference herein. The PCT International Application was published in the English language.

BACKGROUND TO THE INVENTION AND PRIOR ART

The present invention relates to a fuel system for injection of a fuel mixture in a combustion engine.

A way of reducing the discharge of emissions from combustion engines is to inject the fuel at a very high pressure. A so-called "common rail" system is widely used to effect injection at a high pressure in the combustion spaces of a diesel engine. A common rail system comprises a high-pressure pump which pumps fuel at a very high pressure to an accumulator tank (common rail). The pressure in the accumulator tank during operation may be of the order of 350-1600 bar. The fuel in the accumulator tank is intended to be distributed to all of the engine's cylinders. The fuel from the accumulator tank is injected into the combustion spaces of the respective cylinders via electronically controlled injection units. The injection units comprise valves which have to be able to open and close very quickly. The injection units are controlled by an electrical control unit which calculates substantially continuously the amount of fuel to be supplied to the respective cylinders on the basis of information about various parameters of the engine, e.g. load and speed.

There is increasing interest in using more than one fuel in combustion engines. It is often of advantage to be able to inject a fuel mixture made up of two fuels which have different characteristics. For example, a less readily ignitable main fuel may be mixed with a more readily ignitable supplementary fuel, and the thermal energy arising from the ignition of the supplementary fuel is used to ignite the less readily ignitable main fuel. This makes it unnecessary to use other types of additives to raise the ignitability of the main fuel.

Injecting two fuels at high pressure in a combustion engine usually involves using two separate fuel supply systems, viz. a first fuel supply system with a first high-pressure pump which pumps the first fuel to a high pressure in a first accumulator tank (common rail), and a second fuel supply system with a second high-pressure pump which pumps the second fuel to a high pressure in a second accumulator tank (common rail). Thereafter the two fuels can be injected at high pressure from the respective accumulator tanks via suitable injection units. US 2002/0070295, incorporated herein by reference, refers to an example of such an injection unit. Using two separate fuel systems involves a large number of components. The two systems occupy a relatively large amount of fitting space and the component cost is also high.

SUMMARY OF THE INVENTION

The object of the present invention is to propose a fuel system with relatively few components which makes it possible to inject a fuel mixture at high pressure in a combustion engine.

The above object is achieved with the fuel system of the kind mentioned in the introduction which is characterised by the features of the invention. The first fuel and the second fuel are received in a suitable space in the inlet circuit which leads fuel to the engine. A mixing device is provided downstream of that space in the flow direction of the fuel. The mixing device mixes with advantage the two fuels to a substantially uniform fuel mixture. However, it is difficult to mix certain fuels, e.g. ethanol with hydrocarbon fuels. In such cases, the mixing device has to be so effective that an emulsion is created. To create an emulsion, the mixing device has to be capable of breaking up at least one fuel to such small drops that they can float freely around in the other fuel. The present invention therefore uses an inlet circuit with a feed pump, a high-pressure pump, an accumulator tank and at least one injection unit. When such components are used, the fuel mixture can be pressurised and be injected at a high pressure in the engine. Using a suitable space to receive the two fuels and a suitable mixing device makes it possible for the fuel system to be fairly simple and not much more complicated than a fuel system for injection of one fuel.

According to an embodiment of the present invention, said space is situated at a location upstream of the feed pump in the inlet circuit with respect to the intended direction of fuel flow in the inlet circuit. Such a location of the space makes it possible to use the feed pump to convey both the first fuel and the second fuel to the space. This means that only one feed pump need be used to transfer the two fuels. With advantage, the feed pump is used as a mixing device. A feed pump applies more or less effective mixing movements to two fuels which it transfers in the inlet circuit. A suitable feed pump makes it possible to achieve a good mixture of the two fuels passing through the feed pump. Using an existing feed pump to mix the two fuels therefore makes it unnecessary to provide separate mixing means in the inlet circuit. The feed pump is with advantage a gear pump. Gear pumps usually comprise two gearwheels which rotate in mutual engagement, making it possible to achieve very good mixing of the two fuels so that an emulsion is created.

According to another embodiment of the present invention, the first fuel source comprises a first fuel tank and a first fuel line which leads the first fuel from the first fuel tank to the space in the inlet circuit. The first fuel may be the main fuel and may therefore be the main constituent of the fuel mixture. The first fuel line may with advantage be connected to a space in the inlet circuit on the inlet side of the feed pump in the fuel flow direction. This makes it possible for the feed pump to draw the first fuel in the inlet circuit from the first fuel tank via the first fuel line. The first fuel line may comprise a control device by which the flow of the first fuel to the space can be regulated. Such a control device may comprise an automatically or manually operable valve by which it is possible to completely halt the supply of the first fuel. This control may arise in operating situations where it is appropriate to use only the second fuel for operation. Such operating situations may be cold starts. Another such operating situation may be when a vehicle is to be out of action for a time and it is desired to prevent the first fuel from remaining in the inlet circuit if for example the first fuel is corrosive. Alternatively, the control device may comprise a fixed or adjustable throttle valve by which a fixed or variable reduced flow of the first fuel to the space can be provided. The proportion of the first fuel in the fuel mixture can thus be maintained at a constant level or varied to suit different operating situations.

According to another embodiment of the present invention, the second fuel source comprises a second fuel tank and a second fuel line which leads the second fuel from the second fuel tank to the space in the inlet circuit. The second fuel may take the form of a supplementary fuel and therefore constitute a smaller proportion of the fuel mixture than the first fuel. Such a second fuel line may likewise with advantage be connected to a space on the inlet side of the feed pump. The feed pump can therefore draw both the first fuel and the second fuel from the respective fuel tanks. The second fuel line is preferably connected to the same space as the first fuel line. The second fuel line may also comprise a control device by which the flow of the second fuel to the space can be regulated. Such a control device may comprise an automatically or manually operable valve by which it is possible to completely halt the supply of the second fuel. Alternatively, the control device may be a fixed or adjustable throttle valve by which a fixed or variable flow of the second fuel can be provided. In the latter case the proportion of the second fuel in the fuel mixture can be varied to suit different operating situations.

According to another embodiment of the present invention, the fuel system comprises a return circuit for leading unburnt fuel back to a space in the inlet circuit. The fuel not burnt is normally led back to a fuel tank in the fuel system, in which case the return fuel takes the form of a fuel mixture which it is not appropriate to lead back to the first fuel tank, which contains only the first fuel, nor to the second fuel tank, which contains only the second fuel. Accordingly, the return fuel is led instead to the inlet circuit in order to be led again to the engine. The return circuit comprises with advantage a cooler to cool the unburnt fuel mixture before it is led to the space. When the fuel mixture is pressurised in the high-pressure pump, it undergoes warming. It is therefore appropriate to cool the return fuel before it is reused in the inlet circuit and is pressurised.

BRIEF DESCRIPTION OF THE DRAWING

A preferred embodiment of the invention is described below by way of example with reference to the attached drawing, in which:

FIG. 1 depicts a fuel system according to an embodiment of the invention.

DETAILED DESCRIPTION OF A PREFERRED EMBODIMENT OF THE INVENTION

FIG. 1 depicts a fuel system which makes it possible to inject a fuel mixture at a high pressure in a combustion engine 1. The engine 1 is schematically indicated in the drawing. Injecting the fuel mixture at a high pressure reduces the discharge of emissions from the engine 1. The fuel system and the engine 1 may be fitted in a heavy vehicle. The fuel system comprises a first fuel tank 2 with a first fuel 3. The fuel system comprises a second fuel tank 4 with a second fuel 5. The first fuel 3 is in this case the main fuel and the second fuel 5 a supplementary fuel. The first fuel is in this case a relatively less readily ignitable fuel which may be ethanol. The second fuel is a more readily ignitable fuel which may be diesel fuel. A first fuel line 6 extends from the first fuel tank 2 to a space 7a on the inlet side of a feed pump which in this case is a gear pump 7. The first fuel line 6 comprises a valve 8 which can be placed in an open position and a closed position. The first fuel line 6 comprises also a one-way valve 9 to prevent fuel from being led back to the first fuel tank 2. A second fuel line 10 extends from the second fuel tank 4 to the same space 7a on the inlet side of the gear pump 7. The second fuel line 10 comprises an adjustable throttle valve 11 by which the flow in the second fuel line 10 can be regulated. The second fuel line 10 comprises also a one-way valve 12 to prevent fuel from being led back to the second fuel tank 4.

The fuel system comprises an inlet circuit for a fuel mixture which thus consists of the first fuel 2 and the second fuel 5. The inlet circuit comprises a fuel line 13 which leads the fuel mixture from the gear pump 7 to a fuel filter 14 in which pollutants are removed from the fuel. The fuel line 13 then leads the fuel mixture to a high-pressure pump 15 adapted to pressurising the fuel mixture. The fuel line 13 thereafter leads the resulting pressurised fuel mixture to an accumulator tank 16 in the form of a so-called common rail. The fuel pressure in the accumulator tank 16 may be of the order of 350-1600 bar. The inlet circuit also comprises a number of parallel inlet lines 17 which lead the fuel mixture from the accumulator tank 16 to respective injection units 18 for the combustion spaces of the engine 1. The fuel system comprises a return circuit 19 adapted to gathering the portion of the fuel mixture which is not used for combustion. The return circuit 19 thus gathers return fuel from the high-pressure pump 15, the accumulator tank 16 and the injection units 18 via different manifolds. The return circuit 19 leads the gathered return fuel to the same space 7a on the inlet side of the gear pump 7 as the first fuel 2 and the second fuel 4. A fuel cooler 20 is adapted to cooling the return fuel before it is led to the space 7a. As the return fuel has been pressurised, it has probably undergone warming. It is therefore appropriate for it to be cooled before it is again pressurised by the high-pressure pump 15.

An electrical control unit 21 is adapted to controlling the operation of the gear pump 7, the high-pressure pump 15 and the injection units 18. The control unit 21 may take the form of a computer unit provided with suitable software for these purposes. A pressure sensor 16a is fitted in the accumulator tank 16 and is adapted to detecting and sending signals to the control unit 21 which contain information about the fuel pressure in the accumulator tank 16. The control unit 21 is in this case also adapted to operating the valve 8 in the first fuel line 6 and the throttle valve 11 in the second fuel line 10 in order to regulate the composition of the fuel mixture injected into the engine in different operating conditions.

During operation of the engine 1, the gear pump 7 draws the first fuel 3 from the first fuel tank 2 via the first fuel line 6, and the second fuel 5 from the second fuel tank 4 via the second fuel line 10. To this end, the control unit 21 keeps the valve 8 in an open position so that the gear pump 7 conveys a predetermined amount of the first fuel from the first fuel tank 2 to said space 7a. The control unit 21 places the throttle valve 11 in a position such that the gear pump 7 conveys a desired amount of the second fuel 5 from the second fuel tank 4 to the same space 7a. The fuel mixture reaching the space 7a on the inlet side of the gear pump 7 thus comprises a specific proportion of the first fuel 3 and a specific proportion of the second fuel 5.

The first fuel which is not readily ignitable may be ethanol. For ethanol to ignite in a desired way, at least one supplementary material which raises the ignitability of ethanol is normally added. If ethanol is used as first fuel and diesel fuel as second fuel, the proportion of diesel fuel needs to be at least 20% for the fuel mixture to have desired ignition characteristics. It is difficult to add so much diesel fuel to ethanol without causing stratification in the fuel mixture, but it is possible to add such an amount of diesel fuel to ethanol if an emulsion is created. Emulsion means that at least one fuel is finely divided to such small drops that they can float substantially freely in the other fuel. A gear pump 7 has the characteristic that it can finely divide said fuels in such a way that an emulsion is created. The fuel mixture, which may thus be an emulsion, is thereafter pushed into the fuel line 13 by the gear pump 7.

The fuel mixture in the fuel line 13 is led to the high-pressure pump 15 via the fuel filter 14. The high-pressure pump 15 pressurises the fuel mixture so that it acquires a high pressure. The fuel mixture is then led to the accumulator tank 16 in which it is stored at said high pressure. The injection units 18 receive the fuel mixture via the inlet lines 17 from the accumulator tank 16 before injecting it into the combustion spaces of the engine 1. The second fuel, which is the more readily ignitable, ignites only when it is injected into the combustion space. The resulting heat facilitates the ignition of the first fuel. The control unit 21 receives control signals substantially continuously concerning parameters of the engine, e.g. load and speed. The control unit 21 uses this information to calculate the amount of the fuel mixture which needs to be supplied to the combustion spaces of the engine 1. The control unit 21 regulates the injection units 18 so that the fuel mixture is injected into the respective combustion spaces of the engine 1 at desired times and in calculated amounts.

Not all of the fuel mixture transferred by the gear pump 7 in the fuel line 13 can be used for combustion. Accordingly, the return line system 19 receives return fuel from the high-pressure pump 15, the accumulator tank 16 and the injection units 18. As the return fuel consists of a mixture of the first fuel and the second fuel, it cannot be led back to either of the fuel tanks 2, 4. It is therefore led to the space 7a on the inlet side of the gear pump 7. As the return fuel may be at a relatively high temperature, it is cooled in the fuel cooler 20 before being led back to the space 7a, in which it is mixed with the first fuel 3 from the first fuel tank 2 and the second fuel 5 from the second fuel tank 4. The composition of the return fuel is similar to the proportions of the first fuel and the second fuel in the space 7a. The return fuel therefore does not affect the composition of the fuel mixture.

In certain operating situations, e.g. cold starts, it may be desirable to use only the second fuel, which may be diesel fuel. When the control unit 21 receives information to the effect that the engine 1 is at a considerably lower temperature than an intended operating temperature, it can close the valve 8 to halt the supply of the first fuel, which may be ethanol. The control unit 21 can at the same time regulate the throttle valve 11 so that a larger amount of the second fuel is conveyed from the second fuel tank 4 to the gear pump 7.

The invention is in no way confined to the embodiment to which the drawing refers, but may be varied freely within the scopes of the claims. Fuels other than ethanol may of course be used as main fuel, and fuels other than diesel fuel as supplementary fuel. It is also possible to mix the fuels in substantially equal proportions. The throttle valve 11 is variable in this example. It may alternatively apply a fixed amount of throttling so that the percentage of the second fuel in the fuel mixture is kept substantially constant.

The invention claimed is:

1. A fuel system for injection of a fuel mixture in a combustion engine, the fuel system comprises:
    an inlet circuit configured and operable to lead fuel to the engine, the inlet circuit comprises a space configured and operable to receive a first fuel from a first fuel source and a second fuel from a second fuel source, the inlet circuit includes a feed pump configured and operable to transfer fuel into the inlet circuit, the inlet circuit space is located upstream of the feed pump in the inlet circuit with respect to an intended direction of flow in the inlet circuit;
    the feed pump is configured and operable and connected to draw the first fuel from the first fuel source and the second fuel from the second fuel source to feed them to the inlet circuit space;
    a high-pressure pump located to receive and pressurize fuel from the feed pump;
    an accumulator tank configured and operable to receive and store fuel from the high-pressure pump;
    at least one injection unit configured and operable to receive fuel from the accumulator tank and to inject the fuel into a combustion space of the engine;
    a mixing device configured and operable to apply a mixing movement to the first fuel and the second fuel for producing a substantially uniform fuel mixture for the injection unit to inject into the engine's combustion space; and
    a return circuit configured and operable for receiving unburnt fuel from the engine and leading the unburnt fuel back to the space in the inlet circuit.

2. A fuel system according to claim 1, wherein the feed pump is a gear pump.

3. A fuel system according claim 1, wherein the first fuel source comprises a first fuel tank and a first fuel line which is configured and operable to lead the first fuel from the first fuel tank to the space in the inlet circuit.

4. A fuel system according to claim 3, wherein the first fuel line comprises a control device configured and operable to regulate the flow of the first fuel to the space of the inlet circuit.

5. A fuel system according to claim 3, wherein the second fuel source comprises a second fuel tank and a second fuel line which leads the second fuel from the second fuel tank to the space in the inlet circuit.

6. A fuel system according to claim 5, wherein the second fuel line comprises a control device configured and operable to regulate the flow of the second fuel to the space in the inlet circuit.

7. A fuel system according to claim 1, wherein the return circuit comprises a cooler for cooling the unburnt fuel before it is led into the space in the inlet circuit.

8. A fuel system according to claim 1, wherein the combustion engine is a diesel combustion engine.

9. A fuel system according to claim 1, wherein the first fuel is ethanol.

10. A fuel system according to claim 1, wherein the second fuel is diesel fuel.

11. A fuel system according to claim 1, further comprising at least one of an automatically operable valve and a manually operable valve configured to halt the supply of the first fuel to the inlet circuit.

12. A fuel system according to claim 1, further comprising at least one of an automatically operable valve and a manually operable valve configured to halt the supply of the second fuel to the inlet circuit.

13. A fuel system according to claim 1, wherein the pressure of the fuel in the accumulator tank is greater than 350 bar.

* * * * *